US008250266B2

(12) United States Patent
Rugg et al.

(10) Patent No.: US 8,250,266 B2
(45) Date of Patent: Aug. 21, 2012

(54) DATA STORAGE DEVICE COMPATIBLE WITH MULTIPLE INTERCONNECT STANDARDS

(75) Inventors: William L. Rugg, Longmont, CO (US); Nicholas C. Seroff, Boulder, CO (US)

(73) Assignee: Seagate Technology LLC, Cupertino, CA (US)

( * ) Notice: Subject to any disclaimer, the term of this patent is extended or adjusted under 35 U.S.C. 154(b) by 242 days.

(21) Appl. No.: 12/410,360

(22) Filed: Mar. 24, 2009

(65) Prior Publication Data

US 2009/0286421 A1 Nov. 19, 2009

Related U.S. Application Data

(60) Provisional application No. 61/127,808, filed on May 15, 2008.

(51) Int. Cl.
*G06F 13/14* (2006.01)

(52) U.S. Cl. ................................ 710/72; 710/2; 710/62

(58) Field of Classification Search ........................ None
See application file for complete search history.

(56) References Cited

U.S. PATENT DOCUMENTS

| | | | |
|---|---|---|---|
| 4,686,506 | A | 8/1987 | Farago |
| 6,719,591 | B1 | 4/2004 | Chang |
| 6,886,057 | B2 | 4/2005 | Brewer et al. |
| 6,888,727 | B2 | 5/2005 | Chang |
| 6,895,447 | B2 | 5/2005 | Brewer et al. |
| 7,021,971 | B2 | 4/2006 | Chou et al. |
| 7,104,848 | B1 | 9/2006 | Chou et al. |
| 7,108,560 | B1 | 9/2006 | Chou et al. |
| 7,124,152 | B2 | 10/2006 | Fish |
| 7,125,287 | B1 | 10/2006 | Chou et al. |
| 7,182,630 | B1 | 2/2007 | Su |
| 7,182,646 | B1 | 2/2007 | Chou et al. |
| 7,186,147 | B1 | 3/2007 | Chou et al. |
| 7,207,831 | B2 | 4/2007 | Chen |
| 2006/0174049 | A1 | 8/2006 | Lin et al. |
| 2008/0200072 | A1 * | 8/2008 | Cheong ......................... 439/660 |

OTHER PUBLICATIONS

SATA-IO, Serial ATA Revision 2.6, Feb. 2007, pp. 1-600.*

Lenovo, Road Warriors Get Ready—Lenovo Delivers "No Compromises" Ultra portable ThinkPad X300 Notebook PC, Feb. 2008, http://www.lenovo.com/news/us/en/2008/02/x300.html.*

Taiwan Engineering Center "Design Verification for ESATA+USB 2 in 1 Connector Rev.O" Jul. 3, 2006 (3 pages).

WWW.Everythingusb.com "USB Header Adapter Adds Internal USB Ports" Apr. 5, 2007, (1 page).

Elliott, Rob "Serial Attached SCSI General Overview, HP Industry Standard Servers Server Storage Advanced Technology" HP Invent, Sep. 30, 2003 (88 pages).

WWW.cooldrives.com/seatatousb20.html "Serial ATA to USB 2.0 Adapter Cable" Dec. 11, 2008, (12 pages).

(Continued)

*Primary Examiner* — Cheng-Yuan Tseng

(74) *Attorney, Agent, or Firm* — Mitchell K. McCarthy

(57) ABSTRACT

A data storage device comprises a data storage medium and a connector that provides an interface between the data storage medium and a host device. The connector has a shape that substantially conforms to an internal storage interconnect standard. The connector comprises a first set of electrical contacts that substantially conform to the internal storage interconnect standard, and a second set of contacts configured to provide connectivity with the host device in accordance with an external storage interconnect standard. Also described are cables for connecting the data storage device to a host via the external storage interconnect standard as well as an interconnect detector.

10 Claims, 6 Drawing Sheets

OTHER PUBLICATIONS

Joint Proposal from Silicon Image, Seagate and Taiwin Electronics "eSATAp or Power over eSATA proposal" Apr. 27, 2007, (2 pages).

Taiwin Electronics Co., LTD, "External Serial ATA and USB 2 in 1" (2 pages).

Hewlett Packard Company et al., "Universal Serial Bus 3.0 Specification" Revision 1.0, Nov. 12, 2008, (482 pages).

Compaq et al., "Universal Serial Bus Specification" Revision 1.1, Apr. 27, 2000, 327 pp.

Compaq et al., "Universal Serial Bus Specification" Revision 2.0, Sep. 23, 1998, 650 pp.

* cited by examiner

DATA STORAGE DEVICE COMPATIBLE WITH MULTIPLE INTERCONNECT STANDARDS

This application claims the benefit of U.S. Provisional Application No. 61/127,808, filed May 15, 2008, the entire contents of which are incorporated by reference herein.

BACKGROUND

Different data storage devices, such as solid state memory devices and disc drives, may connect to a host device, such as a computer, a personal media player or a network device, according to one of a variety of interconnect standards. An interconnect standard defines both electrical and mechanical interfaces, and the electrical and mechanical interfaces for an interconnect standard are generally exclusive to that interconnect standard.

Interconnect standards include both internal interconnect standards, i.e., standards intended for connectivity between a host device an data storage device contained within a housing of the host device, as well as external interconnect standards, i.e., standards intended for connectivity between a host device an data storage device externally located relative to the host device. Examples of internal interconnect standards include Serial Advanced Technology Attachment (SATA) standards, integrated drive electronics (IDE) standards, Small Computer System Interface (SCSI) standards, and Serial Attached SCSI (SAS) standards. Examples of external interconnect standards include Universal Serial Bus (USB) standards, IEEE-1394 (Firewire) standards, Fiber Channel (FC) standards, Internet SCSI (iSCSI) standards and External SATA (eSATA) standards.

SUMMARY

As one example, this disclosure is directed to a data storage device including a data storage medium and a connector that provides an interface between the data storage medium and a host device. The connector has a shape that substantially conforms to an internal storage interconnect standard. The connector includes a first set of electrical contacts that substantially conform to the internal storage interconnect standard, and a second set of contacts configured to provide connectivity with the host device in accordance with an external storage interconnect standard.

These and various other features and advantages will be apparent from a reading of the following detailed description.

DETAILED DESCRIPTION

Figure 1A:
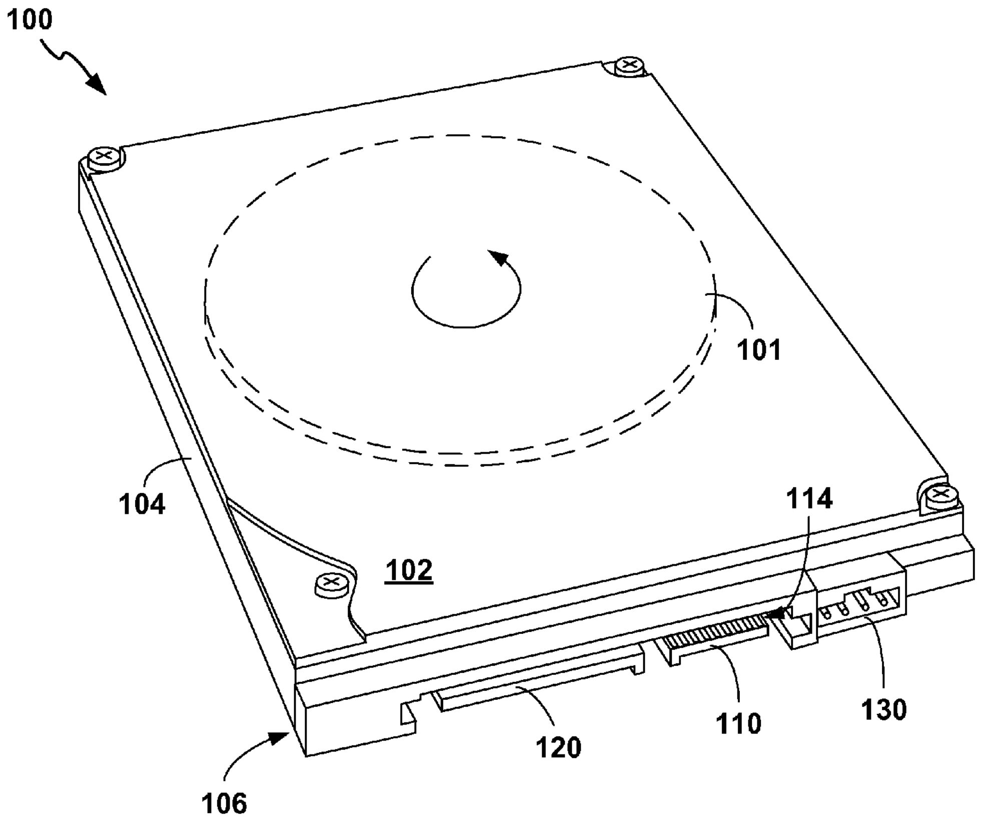
FIGS. 1A-1B illustrate a data storage device including a modified SATA connector having an extra set of electrical contacts configured to provide a USB connection.
Figure 1B:
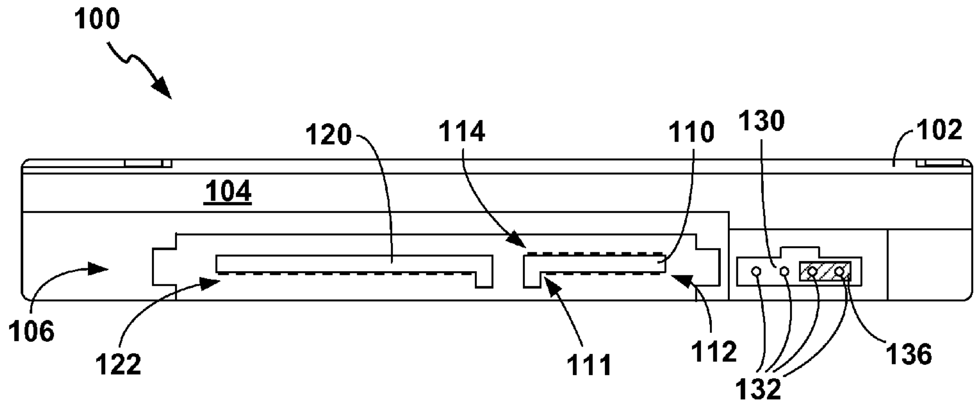
Figure 2:
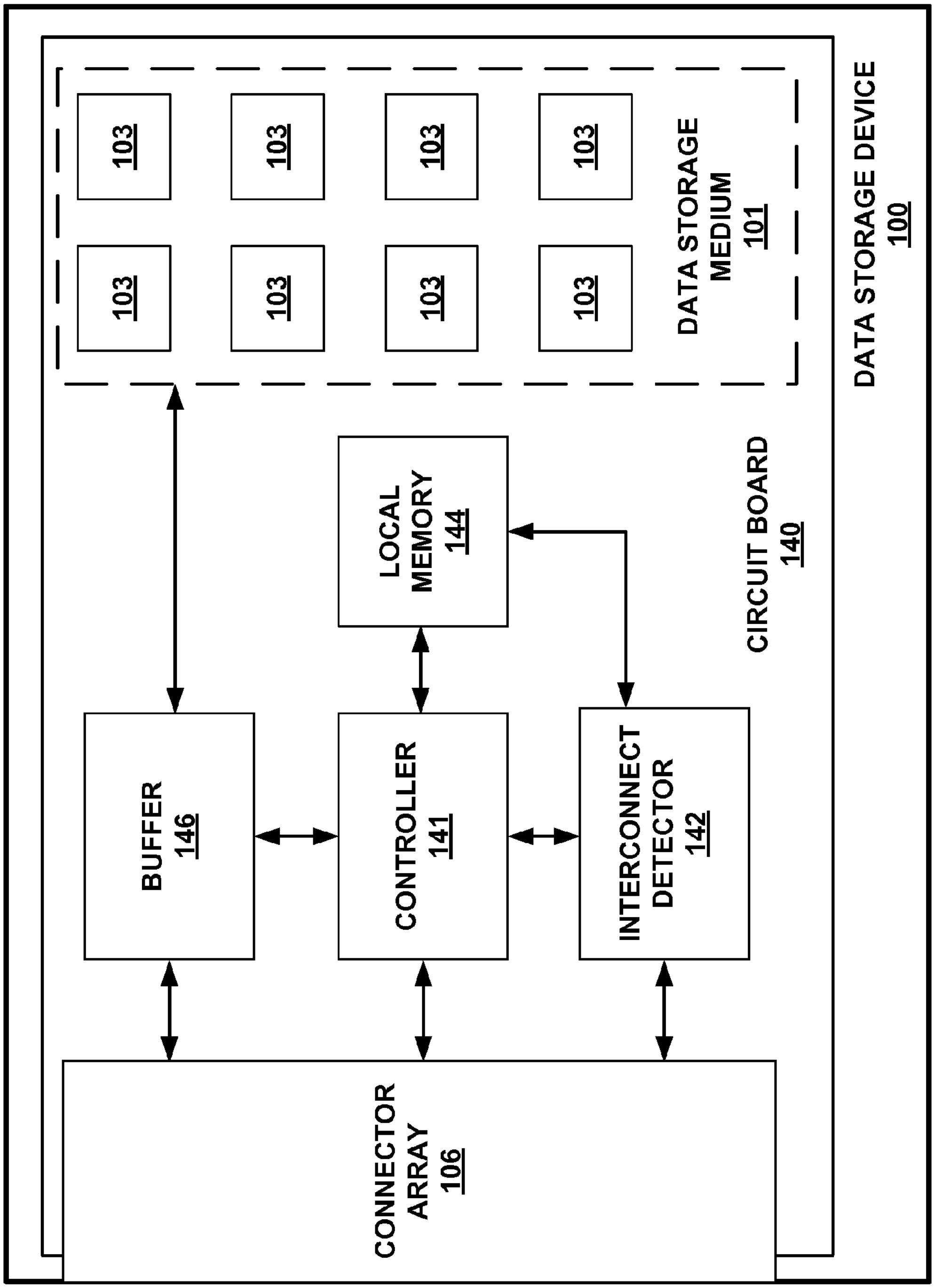
FIG. 2 is a conceptual block diagram of a data storage device compatible with multiple interconnect standards.

FIGS. 1A-1B illustrate data storage device 100. FIG. 2 illustrates a conceptual block diagram of data storage device 100. Data storage device 100 is compatible with multiple interconnect standards. Specifically, as shown in FIGS. 1A-1B, data storage device 100 includes a standard Serial Advanced Technology Attachment (SATA) connector array 106, including SATA power connector 120 and modified SATA connector 110. Connector 110 is a modified connector because it includes electrical contacts 114, which are in addition to the electrical contacts defined by a SATA interconnect standard, contacts 112. As will be described in greater detail below, data storage device 100 and electrical contacts 114 are configured to provide connectivity between data storage device 100 and a host device according to a USB standard.

Data storage device 100 includes base 104 and cover 102, which combine to form a housing containing data storage medium 101. As shown in FIG. 1A, data storage medium 101 may include a rotatable magnetic data storage disc. In addition, as shown in FIG. 2, data storage medium 101 may include solid state memory with one or more memory modules 103 mounted on circuit board 140. Examples of suitable data storage media include rewriteable magnetic data storage discs, solid state memory, such as flash memory, static random access memory (SRAM), and dynamic random access memory (DRAM). Other data storage media may also be used, and in some examples, data storage medium 101 may include more than one data storage medium. In different examples, data storage medium 101 may provide a data storage capacity of at least 10 gigabytes (GB), a data storage capacity of at least 20 GB, a data storage capacity of at least 40 GB, a data storage capacity of at least 100 GB, a data storage capacity of at least 200 GB, or even a data storage capacity of at least 500 GB.

Figure 4:
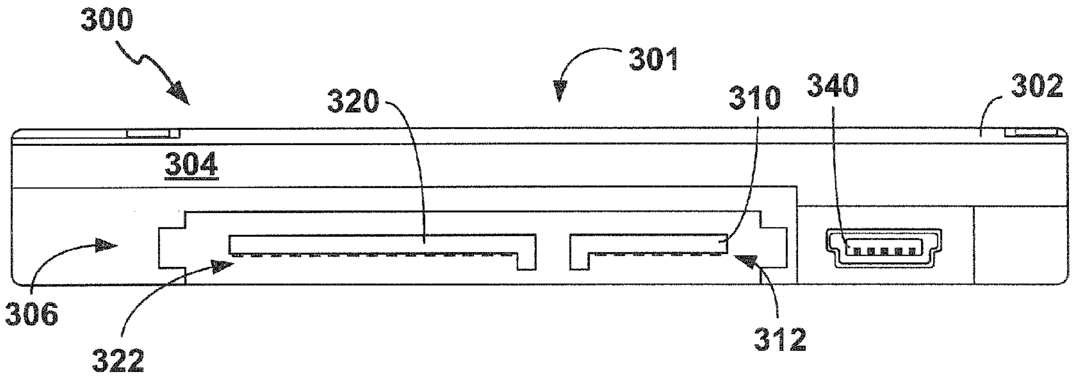
FIG. 4 illustrates a data storage device including a connector array including a SATA connector and a USB connector.

Data storage device 100 further includes connector array 106. Connector array 106 includes SATA power connector 120 including electrical contacts 122, modified SATA connector 110 and jumper module 130 with speed-select pins 132 with jumper 136. While jumper module 130 is shown as part of connector array 106, jumper module 130 may be positioned at any location on data storage device 100. For example, jumper module 130 may be positioned on the back of data storage device 100, opposite connector array 106. Such a configuration would facilitate space for additional connectors to be included with connector array 106. One such example is shown in FIG. 4, which includes a USB connector as part of a connector array.

Connector array 106, including the physical dimensions of SATA power connector 120 and modified SATA connector 110, substantially conform to a SATA standard provided by the SATA International Organization. As referred to herein, substantial conformance to an interconnect standard means that an interface provides functional connectivity with a mating interface that meets the interconnect standard. As of the filing of this application, the SATA International Organization has provided at least three specifications including: the SATA 1.5 GB/s specification, a SATA 3 GB/s specification and a SATA 6 GB/s specification. The SATA 6 GB/s specification is also referred to as, "Serial ATA International Organization: Serial ATA Revision 3.0," and was ratified by the SATA International Organization on or about Aug. 18, 2008. The entire contents of each of these SATA specifications are incorporated by reference herein. In other examples, a connector or connector array may substantially conform to a different internal interconnect standard such as an Integrated Drive Electronics (IDE) standard, also referred to as a Parallel Advanced Technology Attachment (PATA) standard, a Small Computer System Interface (SCSI) standard, a Serial Attached SCSI (SAS) standard and an ultra ATA standard. This list is not exhaustive and other internal interconnect standards may also be suitable in accordance with the techniques disclosed herein.

Modified SATA connector 110 is a male connector with an L-shaped cross-section including a long leg and a short leg that meet to form inside corner 111. Electrical contacts 112 are located on the long leg of the L-shaped cross-section on the same side of the long leg as inside corner 111. Electrical contacts 112 include seven separate electrical contacts configured in accordance with a SATA specification to provide connectivity with a host device according to the SATA specification.

Modified SATA connector 110 also includes electrical contacts 114, which constitute additional electrical contacts other than those provided for in a SATA specification. Electrical contacts 114 are located in on the long leg of the L-shaped cross-section on an opposite side of the long leg relative to inside corner 11. Electrical contacts 114 include nine separate electrical contacts to facilitate connectivity with a host device in accordance with an external interconnect standard, such as a USB standard as defined by USB Implementers Forum, Inc. As of the filing of this application, USB Implementers Forum, Inc. has published at least four specifications including: the USB 1.0 specification, the USB 1.1 specification, the USB 2.0 specification, and the USB 3.0 specification. The USB 3.0 specification, revision 1.0 was released on or about Nov. 12, 2008 by USB Implementers Forum, Inc. In addition, the USB 1.0 specification was released in or about January, 1996, the USB 1.1 specification was released in or about September, 1998, while the USB 2.0 specification was released in or about April, 2000. The entire contents of each of these USB specifications are incorporated by reference herein. In other examples, a connector or connector array may facilitate connectivity with a host device in accordance with a different external interconnect standard such as an IEEE-1394 (Firewire) standard, a Fiber Channel (FC) standard, an Internet SCSI (iSCSI) standard, and an External SATA (eSATA) standard. This list is not exhaustive and other external interconnect standards may also be suitable in accordance with the techniques disclosed herein. In some examples, a modified connector, such as connector 110 may instead facilitate connectivity according to multiple internal interconnect standards alternatively or in addition to facilitating connectivity according to one or more external interconnect standards.

Figure 6:
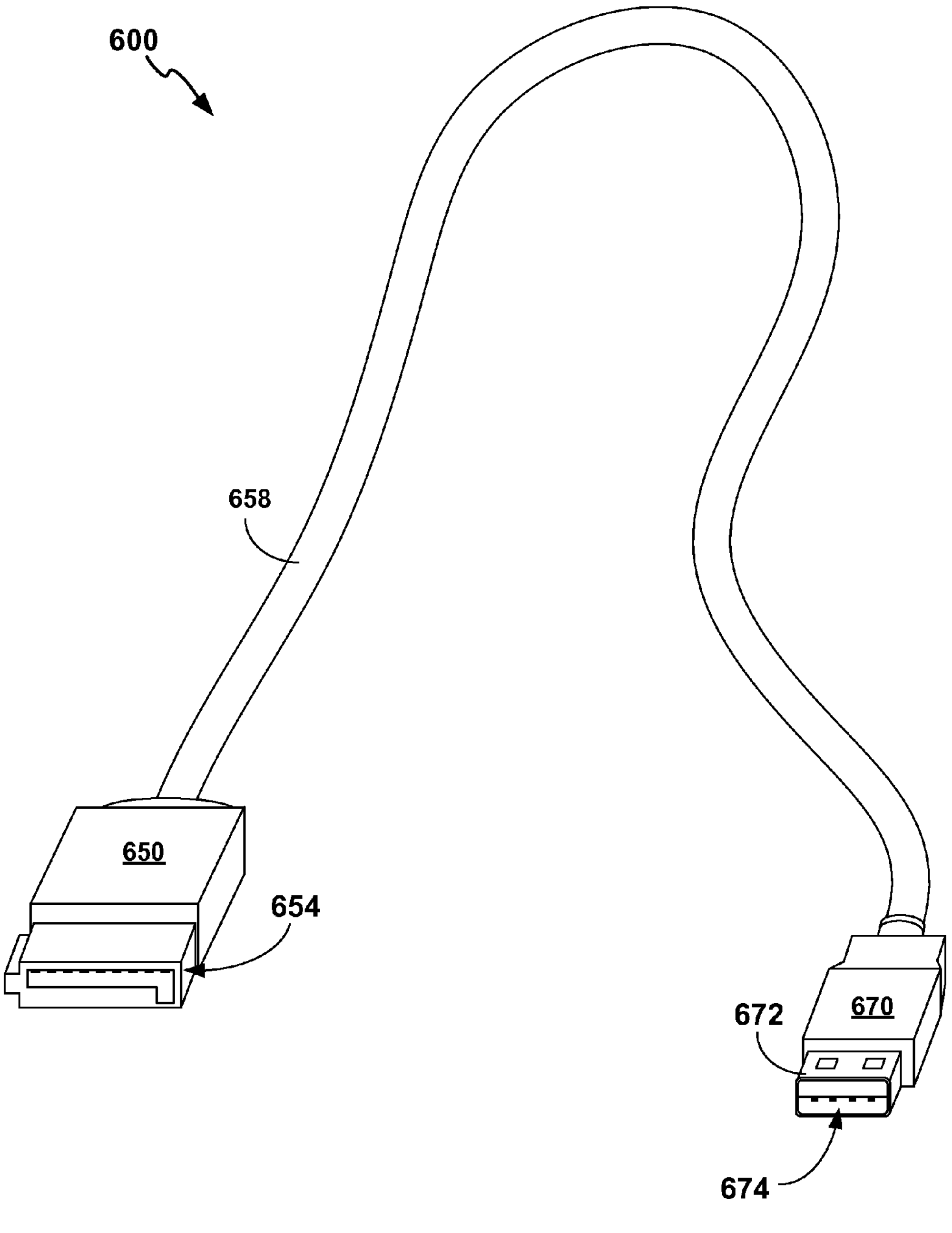
FIG. 6 illustrates a cable including a modified SATA connector and a USB connector.

As previously mentioned, electrical contacts 114 include nine separate electrical contacts to facilitate connectivity with a host device in accordance with an external interconnect standard, such as a USB standard. As an example, the USB 3.0 specification defines an interconnect standard that includes nine individual conductors. While the USB 3.0 specification includes nine electrical contacts, other external interconnect standards include different numbers of electrical contacts and the number of separate electrical contacts contained in electrical contacts 114 may be modified accordingly. Data storage device 100 may be configured to communicate using electrical contacts 114 and communication protocols associated with the USB 3.0 specification. Using a cable that converts the configuration of electrical contacts 114 to conform to a connector defined by an external interconnect standard, such as the USB 3.0 specification, data storage device 100 may be directly connected to a host device using the external interconnect standard. Cable 600, as shown in FIG. 6, is one example of such a cable.

Even with the addition of electrical contacts 114, connector array 106 is fully compatible with devices configured according to the SATA interconnect standard. For example, data storage device 100 can be directly mounted in a disc drive bay of a laptop computer configured according to the SATA interconnect standard. In such a configuration, the electrical connection between the laptop computer and data storage device may only include contacts 112, and not contacts 114. In other examples, an external interconnect standard may be used simultaneously with an internal interconnect standard, e.g., to connect data storage device 100 to more than one host device or to increase the data transfer rate between the data storage device 100 and the host device. As another example, data storage device 100 may be configured such that a host device may recognize data storage device 100 as two separate devices: one device that communicates via an internal interconnect standard and one device that communicates via an external interconnect standard. In any of these examples, a cable such as cable 500 (FIG. 5) may be used to provide electrical connections between data storage device 100 and a host device.

With reference to FIG. 2, upon initial connection to the host, interconnect detector 142 determines the presence of a physical connection to the host device and indentifies an interconnect standard of the physical connection. For example, interconnect detector 142 may determine if the interconnect standard of the physical connection is a SATA standard or a USB standard or a combination thereof. Interconnect detector 142 stores an indication of the interconnect standard of the physical connection in local memory 144.

Following this initial connection, data storage device 100 receives data access commands, such as read or write commands, from a host device via modified SATA connector 110 in connector array 106. Incoming commands are processed by controller 141, which is mounted to circuit board 140. Controller 141 communicates with the host device in accordance with the interconnect standard of the physical connection as stored in local memory 144. Controller 141 operates in accordance with programming stored in local memory 144 to schedule execution of the data access commands. Buffer 146 temporarily stores data to be written to data storage medium 101 and temporarily stores data from data storage medium 101 pending transfer to a host. In some examples, the functionality of controller 141 and interconnect detector 142 may be included in a common integrated circuit mounted to circuit board 140.

Data storage device 100 provides numerous advantages over a data storage device that facilitates only a single interconnect standard. By facilitating multiple interconnect standards, data storage device may be used as both an internal data storage device an external data storage device. While such flexibility may be useful to a consumer, it may also be advantageous from a business and manufacturability standpoint. Manufacturing facilities for data storage devices represent significant investments. The flexibility provided by the multiple interconnect standards of data storage device 100 allows a manufacturer to supply both external or internal data storage devices as the market demands without altering its manufacturing facilities or production schedule. Post-production, a manufacturer may choose to constrain the functionality of data storage device 100 to only one of the interconnect standards facilitated by data storage device 100. Correspondingly, the manufacture may set different price points for the different interconnect standards data storage device 100 to maximize the profitability of data storage device 100. In addition, a manufacturer may modify data storage device 100 in manner suitable for its intended use. For example, a manufacture may add a shock absorption case to the exterior of data storage device 100 when intended to be used as an external data storage device or add mounting fixtures to the exterior of data storage device 100 when intended to be used as an internal data storage device.

Figure 3:
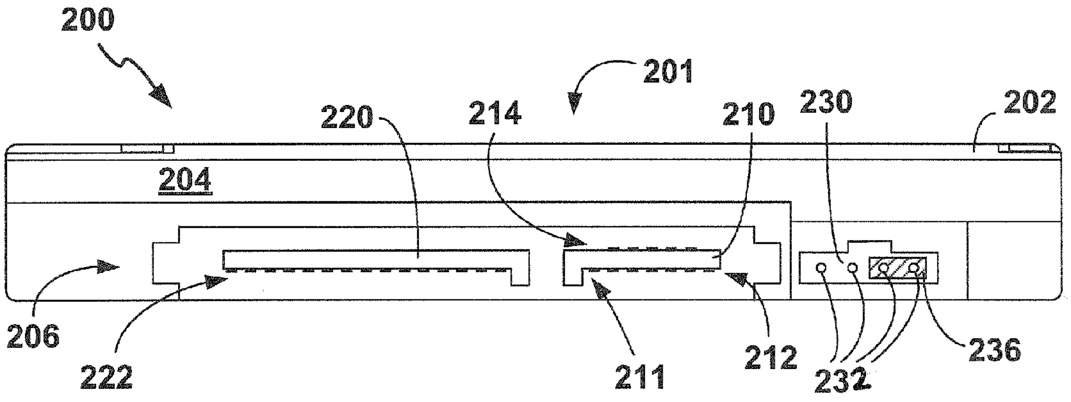
FIG. 3 illustrates an alternative example to the data storage device depicted in FIGS. 1A-1B.

FIG. 3 illustrates data storage device 200, which provides an alternative electrode configuration for modified SATA connector 210 relative to modified SATA connector 110 of data storage device 100. In other respects, data storage device 200 is substantially similar to data storage device 100. For brevity, some details of data storage device 200 that are the same or similar to details already discussed with respect to data storage device 100 are not repeated with respect to data storage device 200.

Like data storage device 100, data storage device 200 is compatible with multiple interconnect standards. Data storage device 200 includes a connector array 206 including SATA power connector 220 and modified SATA connector 210. Connector 210 is a modified connector because it includes electrical contacts 214, which are in addition to the electrical contacts defined by an SATA interconnect standard, contacts 212. Connector array 206 and modified SATA connector 210 substantially conform to a SATA standard. As will be described in greater detail below, data storage device 200 and electrical contacts 214 are configured to provide connectivity according to a USB standard.

Data storage device 200 includes base 204 and cover 202, which combine to form a housing containing data storage medium 201. Data storage medium 201 may be a rotatable magnetic data storage disc, solid state memory, or other data storage medium. Data storage device 200 further includes connector array 206. Connector array 206 includes SATA power connector 220 including electrical contacts 222, modified SATA connector 210 and speed-select pins 232 with jumper 236. Connector array 206, including the physical dimensions of SATA power connector 220 and modified SATA connector 210, substantially conforms to a SATA standard provided by the SATA International Organization.

Modified SATA connector 210 is a male connector with an L-shaped cross-section including a long leg and a short leg that meet to form inside corner 211. Electrical contacts 212 are located on the long leg of the L-shaped cross-section on the same side of the long leg as inside corner 211. Electrical contacts 212 include seven separate electrical contacts configured in accordance with a SATA specification to provide connectivity with a host device according to the SATA specification.

Modified SATA connector 210 includes electrical contacts 214, which constitute additional electrical contacts other than those provided for in a SATA specification. Electrical contacts 214 are located in on the long leg of the L-shaped cross-section on an opposite side of the long leg relative to inside corner 21. Electrical contacts 214 include seven separate electrical contacts. The combination of electrical contacts 214 with electrical contacts 212 facilitates connectivity with a host device in accordance with an external interconnect standard, such as a USB standard or other standard. For example, the USB 3.0 specification includes nine conductors. To facilitate connectivity according to the USB 3.0 specification data storage device uses a total of at least nine contacts of electrical contacts 212, 214 must be used. For example, two contacts of electrical contacts 212 may be combined with the seven contacts of electrical contacts 214. Using cable that converts the configuration of electrical contacts 212, 214 to conform to a connector defined by an external interconnect standard, such as the USB 3.0 specification, data storage device 200 may be directly connected to a host device using the external interconnect standard.

FIG. 4 illustrates data storage device 300, which provides an alternative configuration for connector array 306 relative to connector array 106 of data storage device 100. In other respects, data storage device 300 is substantially similar to data storage device 100. For brevity, some details of data storage device 300 that are the same or similar to details already discussed with respect to data storage device 100 are not repeated with respect to data storage device 300.

Like data storage device 100, data storage device 300 is compatible with multiple interconnect standards. Data storage device 300 includes a standard SATA connector array 306, including SATA power connector 320 including electrical contacts 322 and standard SATA connector 310 including electrical contacts 312. In addition, connector array 306 includes mini-USB connector 340 to facilitate connectivity according to a USB standard. The use of a mini-USB connector facilitates connectivity between data storage device 300 and a host device using a cable that conforms to a USB standard as opposed to a custom cable as required by data storage devices 100, 200. In other examples, a connector that conforms to a different internal or external interconnect standard may be substituted for mini-USB connector 340.

Figure 5:
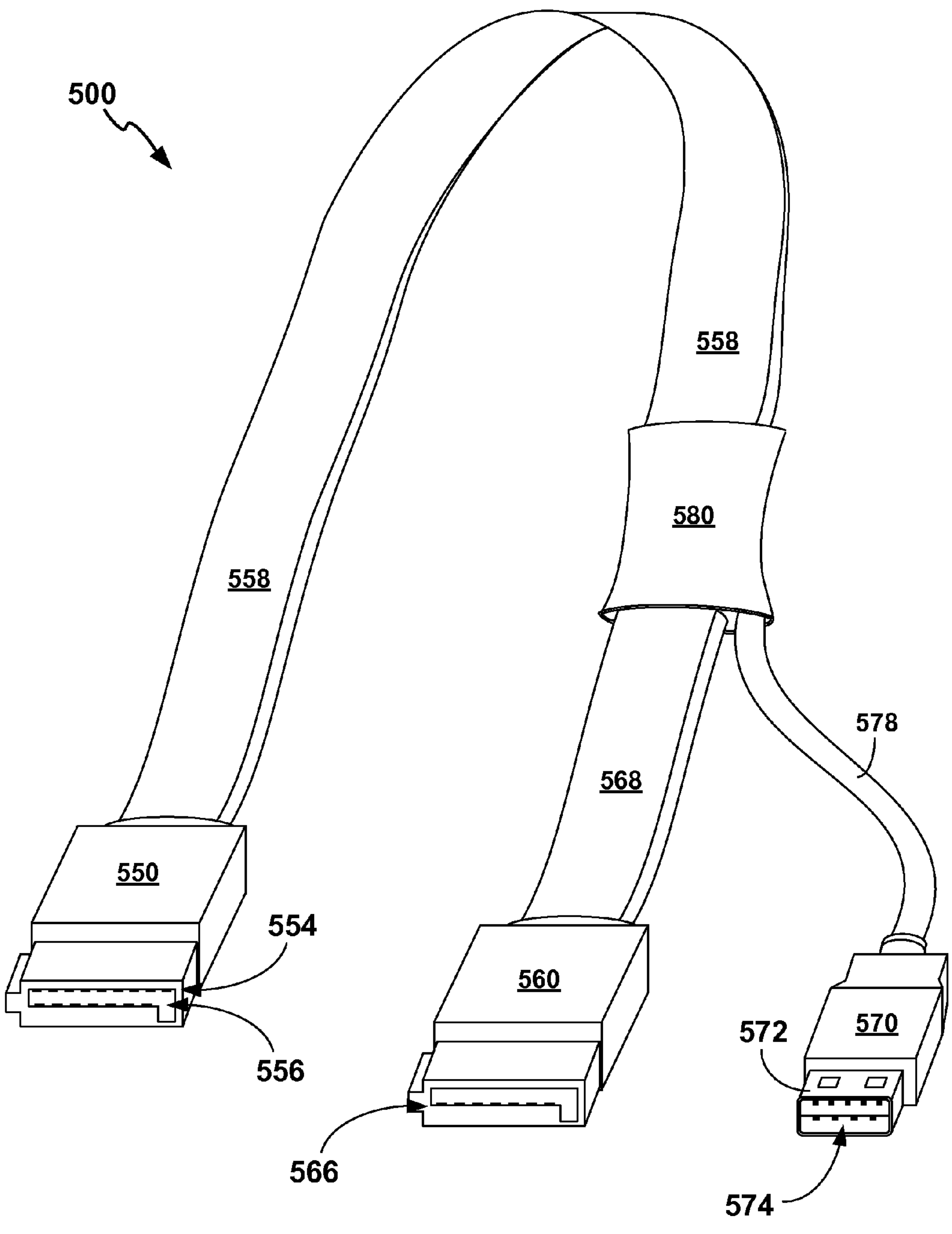
FIG. 5 illustrates a cable that facilitates simultaneous SATA and USB connectivity.

FIG. 5 illustrates cable 500. Cable 500 facilitates simultaneous SATA and USB connectivity between a host and a data storage device, such as data storage device 100 (FIG. 1). Cable 500 includes female connector 550 with electrical contacts 554, 556, standard SATA connector 560 with electrical contacts 566, and standard USB connector 570 with electrical contacts 574 and shield 572.

Female connector 550 is configured to mate with modified SATA connector 110 (FIG. 1) and has a shape that substantially conforms to an internal interconnect standard, such as a SATA standard. Cabling section 558 includes sixteen conductors, one for each of electrical contacts 554, 556. Cabling section 558 extends between female connector 550 and junction 580.

At junction 580, the conductors within cabling section 558 connect to conductors within cabling sections 568, 578. Cabling section 568 includes seven conductors to provide connectivity in accordance with a SATA standard, such as a SATA 6.0 GB/s specification whereas cabling section 578 includes nine connectors in accordance with a USB standard, such as a USB 3.0 specification. The conductors within cabling sections 558, 568, 578 and junction 580 serve to directly connect electrical contacts 554 of connector 550 to electrical contacts 566 of connector 560 and to directly connect electrical contacts 556 of connector 550 to electrical contacts 574 of connector 570.

FIG. 6 illustrates cable 600. Cable 600 facilitates USB connectivity between a host and a data storage device, such as data storage device 100 (FIG. 1). Cable 600 includes female connector 650 with electrical contacts 654 and standard USB connector 670 with electrical contacts 674 and shield 672.

Female connector 650 is configured to mate with modified SATA connector 110 (FIG. 1) and has a shape that substantially conforms to an internal interconnect standard, such as a SATA standard. Female connector 650 does not include contacts according a SATA specification, because such contacts are not necessary for USB connectivity. I.e., in data storage device 100 contacts 112 are configured to provide connectivity according to a SATA specification, but not a USB specification.

Cabling section 658 includes nine conductors to provide connectivity in accordance with a USB specification. The conductors within cabling section 658 serve to directly connect electrical contacts 654 of connector 650 to electrical contacts 674 of connector 670 to facilitate USB connectivity.

Figure 7:
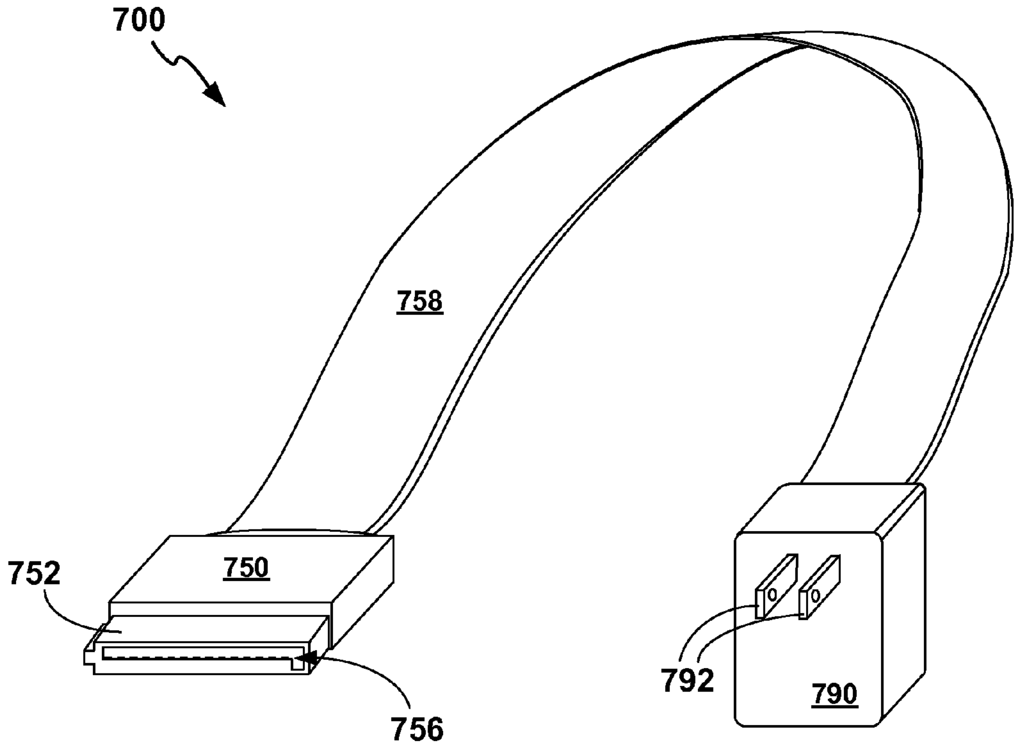
FIG. 7 illustrates a power cable including a SATA power connector, an AC outlet plug and an AC to DC converter.

FIG. 7 illustrates power cable 700. Power cable 700 includes SATA power connector 750, cabling 758, AC to DC converter 790 and outlet prongs 792. Power cable 700 may be used to directly power a device including a SATA power connector, such as connector 120 of data storage device 100 (FIG. 1). While a USB standard includes provisions for power supply, this power supply may be insufficient to power a data storage device such as data storage device 100. With such data storage devices, power cable 700 may be used to power the data storage device when it is operated as an external data storage device in combination with a separate cable that facilitates USB connectivity between the data storage device and a host device. SATA specifications include different voltages for different electrical contacts of electrical contacts 756. AC to DC converter 790 provides different DC voltages to different electrical contacts as provided by the SATA specifications.

Figure 8:
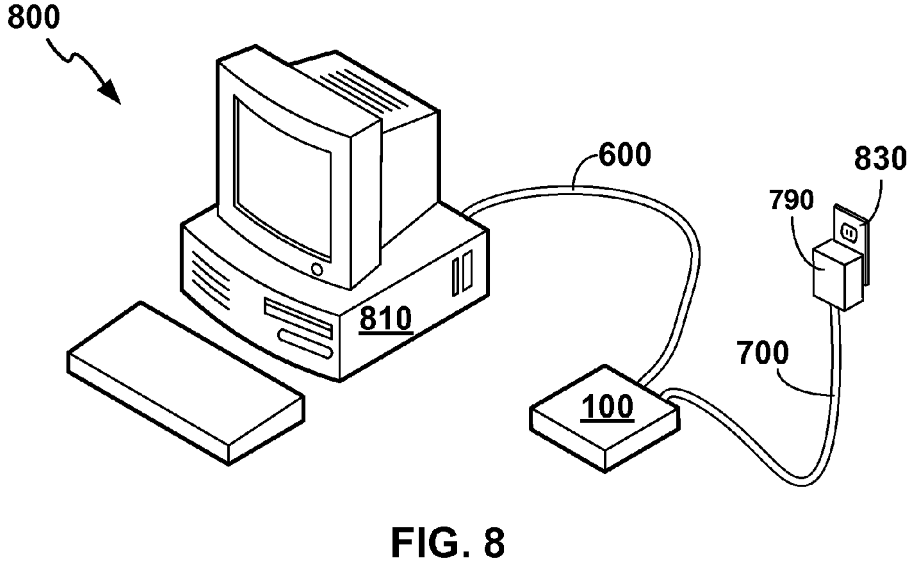
FIG. 8 illustrates a system including the data storage device of FIG. 1 connected to a host computer via the cable of FIG. 6.

FIG. 8 illustrates system 800, which includes data storage device 100 (FIG. 1) connected to host device 810 via cable 600 (FIG. 6). System 800 also includes power cable 700 (FIG. 7), which includes AC to DC inverter (790) plugged into outlet 830. Data storage device is configured to communicate with host device using a USB standard, such as the USB 3.0 specification. While, the USB standards.

As shown in FIG. 8, host device 800 is a personal computer. In other example, data storage device 100 may be connected to different host devices using an internal or external interconnect standard. Example of suitable host devices include a network devices such as a server, a laptop, a media player or other portable device, a video game console as well as other devices. In this manner, data storage devices that facilitate connectivity according to multiple interconnect standards as described herein are suitable for use in wide variety of devices that include data storage.

The implementations described above and other implementations are within the scope of the following claims.

The invention claimed is:

1. A data storage device comprising:

a data storage medium;

a modified Serial Advanced Technology Attachment (SATA) connector having an L-shaped cross-section including a long leg and a short leg joined to form a corner, a first set of electrical contacts located on the L-shaped cross-section and a different second set of electrical contacts located on the L-shaped cross-section, the sets to selectively provide connectivity between the data storage medium and a host device in accordance with a SATA interconnect standard and an interconnect standard selected from the group consisting of an IEEE-1394 (Firewire) standard, a Fiber Channel (FC) standard, an Internet SCSI (iSCSI) standard, an External SATA (eSATA) standard, an Integrated Drive Electronics (IDE) standard, a Parallel Advanced Technology Attachment (PATA) standard, a Small Computer System Interface (SCSI) standard, a Serial Attached SCSI (SAS) standard, and an ultra ATA standard;

an interconnect detector configured to determine the presence of a physical connection of the data storage device to the host device and to identify a detected interconnect standard of the physical connection as being one of the SATA interconnect standard and the selected interconnect standard; and a controller responsive to data access commands from the host device and responsive to the detected interconnect standard to transfer data between the data storage medium and the host device in accordance with the SATA interconnect standard via the first set of electrical contacts and to transfer the data between the data storage device and the host device in accordance with the selected interconnect standard via the second set of electrical contacts.

2. The data storage device of claim 1, wherein the first set of electrical contacts are located on the long leg of the L-shaped cross-section on the same side of the long leg as an inside portion of the corner.

3. The data storage device of claim 1, wherein the data storage medium includes a rewriteable magnetic data storage disc.

4. The data storage device of claim 1, wherein the data storage medium includes a solid state memory capacity of at least 10 gigabytes (GB).

5. The data storage device of claim 4, wherein the solid state memory is selected from a group consisting of:

flash memory;

static random access memory (SRAM); and dynamic random access memory (DRAM).

6. The data storage device of claim 4, wherein the solid state memory provides a data storage capacity of at least 20 gigabytes (GB).

7. The data storage device of claim 1, further comprising a circuit board and the controller mounted on the circuit board.

8. The data storage device of claim 7, further comprising the interconnect detector mounted on the circuit board.

9. The data storage device of claim 8, wherein the controller and the interconnect detector are included in a common integrated circuit.

10. A data storage device comprising:

a data storage medium;

a circuit board;

one or more connectors on the circuit board to provide connectivity between the data storage device and a host device in accordance with a Serial Advanced Technology Attachment (SATA) and a Universal Serial Bus (USB) interconnect standards, such that the connectors include a shape that substantially conforms to the SATA standard, the connectors including a first set of electrical contacts that substantially conforms to the SATA standard, and a second set of contacts to provide connectivity with the host device in accordance with the USB standard;

an interconnect detector on the circuit board, the interconnect detector configured to determine the presence of a physical connection to the host device and to identify a detected interconnect standard of the physical connection between the SATA and USB interconnect standards; and a controller on the circuit board configured to:

receive data access commands from the host device in accordance with the detected interconnect standard of the physical connection via the one or more connectors;

process the data access commands by accessing the data storage medium; and send responses to the data access commands to the host in accordance with the detected interconnect standard of the physical connection, the controller and the interconnect detector are included in a common integrated circuit mounted to the circuit board;

the connectors having an L-shaped cross-section including a long leg and a short leg that meet to form an inside corner, the first set of electrical contacts located on one side of the long leg, and the second set of electrical contacts located on an opposite side of the long leg.

* * * * *